(12) United States Patent
Koubaroulis et al.

(10) Patent No.: US 7,630,551 B2
(45) Date of Patent: *Dec. 8, 2009

(54) METHOD AND SYSTEM FOR LINE EXTRACTION IN DIGITAL INK

(75) Inventors: Dimitrios Koubaroulis, Balmain (AU); Jonathon Leigh Napper, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 30 days.

This patent is subject to a terminal disclaimer.

(21) Appl. No.: 11/944,404

(22) Filed: Nov. 21, 2007

(65) Prior Publication Data

US 2008/0304748 A1 Dec. 11, 2008

Related U.S. Application Data

(63) Continuation of application No. 10/778,090, filed on Feb. 17, 2004, now Pat. No. 7,526,128.

(30) Foreign Application Priority Data

Feb. 26, 2003 (AU) ............................. 2003900865

(51) Int. Cl.
*G06K 9/00* (2006.01)
(52) U.S. Cl. ...................... 382/179; 382/202
(58) Field of Classification Search .............. 382/186, 382/187, 189, 203, 179, 177, 178, 226, 311, 382/202, 296, 298, 309; 715/863, 209, 273, 715/268, 255; 345/179, 173
See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,157,737 A | 10/1992 | Sklarew | |
| 5,392,363 A | 2/1995 | Fujisaki et al. | |
| 5,477,012 A | 12/1995 | Sekendur | |
| 5,652,412 A | 7/1997 | Lazzouni et al. | |
| 5,661,506 A | 8/1997 | Lazzouni et al. | |
| 5,692,073 A | 11/1997 | Cass | |
| 5,740,273 A | 4/1998 | Parthasarathy et al. | |
| 5,768,417 A * | 6/1998 | Errico et al. | 382/186 |

(Continued)

FOREIGN PATENT DOCUMENTS

| | | |
|---|---|---|
| GB | 2306669 A | 5/1997 |
| WO | WO 94/28505 A | 12/1994 |
| WO | WO 99/18487 A2 | 4/1999 |
| WO | WO 99/50787 A1 | 10/1999 |

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.
Abuhaiba Isi et al., "Line extraction and stroke ordering of text pages" Document Analysis and Recognition, 1995, Proceedings of the Third International Conference on Montreal, Que, Canada 14-16 August, Los Alamitos CA, USA, IEEE Comput. Soc., US, vol. 14, Aug. 14, 1995, pp. 390-393, XP010230961, ISBN: 0-8186-7128-9 (the whole document).

(Continued)

*Primary Examiner*—Sheela C Chawan

(57) ABSTRACT

A method and system of line extraction in a digital ink sequence of handwritten text data points is provided in which a stroke sequence comprised of a sequence of strokes is obtained, the strokes are segmented into a sequence of substrokes by applying a stroke segmentation algorithm, angular differences between neighboring groups of substrokes, in the sequence of substrokes, are calculated, and the positions of the extrema of the angular differences are determined, thereby identifying the substrokes at line breaks and enabling line extraction.

11 Claims, 13 Drawing Sheets

U.S. PATENT DOCUMENTS

| | | | |
|---|---|---|---|
| 5,818,963 | A * | 10/1998 | Murdock et al. ............ 382/187 |
| 5,852,434 | A | 12/1998 | Sekendur |
| 6,076,734 | A | 6/2000 | Dougherty et al. |
| 6,285,785 | B1 * | 9/2001 | Bellegarda et al. .......... 382/187 |
| 6,301,386 | B1 * | 10/2001 | Zhu et al. ................... 382/176 |
| 6,339,655 | B1 * | 1/2002 | Aharonson et al. .......... 382/186 |
| 6,499,043 | B1 | 12/2002 | Forcier |
| 6,654,490 | B2 | 11/2003 | Love |
| 6,687,876 | B1 | 2/2004 | Schilit et al. |
| 6,718,060 | B1 | 4/2004 | Yokota et al. |
| 6,964,374 | B1 | 11/2005 | Djuknic et al. |
| 7,359,551 | B2 * | 4/2008 | Napper ....................... 382/186 |
| 2005/0154707 | A1 | 7/2005 | Napper et al. |

OTHER PUBLICATIONS

Hones, F et al, "Text string extraction within mixed-mode documents" Document analysis and recognition, 1993, Proceedings of the Second International Conference on Tsukuba Science City, Japan, Oct. 20-22, 1993, Los Alamitos, CA, USA, IEEE Comput. Soc., Oct. 20, 1993 pp. 655-659, XP010135696 ISBN:0-8186-4960-7 (the whole document).

IBM Corp, Arc Segmentation Method Using Writing Direction: IBM Technical Disclosure Bulletin, IBM Corp, New York, US, col. 35, No. 1B, Jun. 1, 1992, pp. 220-227, XP000309038 ISSN: 0018-8689 (the whole document).

O'Gorman, L et al., "The Doucment Spectrum for Page Layout Analysis" IEEE Transactions on Pattern Analysis and Machine Intelligence, IEEE Service Center, Los Alamitos, CA, US, vol. 15, No. 11, Nov. 1, 1993, pp. 1162-1173, XP000413107 ISSN:0162-8828 (Section III, Section V).

Raghupathy,S; "Ink parsing in TabletPC", Miicrosoft Corporation, 2002, pp. 1-7, XP002277314.

Xiaoyi, Jiang et al, "Skew detection of document images by focused nearest-neighbor clustering" Document Analysis and Recognition, 1999/ ICDAR '99, Proceedings of the Fifth International Conference on Bagalore, India 200-Sep. 22, 1999, Los Alamitos, CA, USA, IEEE Comput. Soc, US, Sep. 20, 1999, pp. 629-632, XP010351152 ISBN: 0-7695-0318-7 (Section 2).

* cited by examiner

I speak English
Je parle français
Μιλάω Ελληνικά
Я говорю по-русски
Io parlo Italiano

FIG. 3

Lines in handwritten documents
vary in length
annotation!
I like this!
orientation    whatever
font size  sortical  diacriticals Signatures

FIG. 4

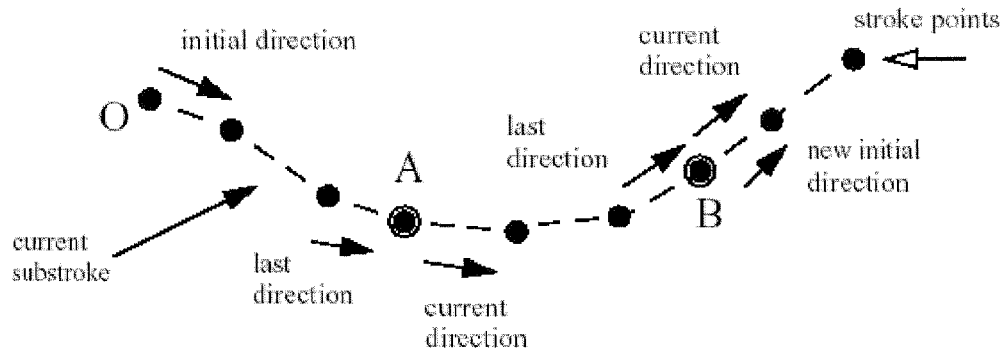
FIG. 5
FIG. 6
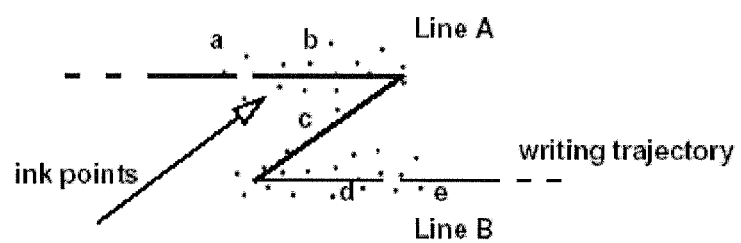
FIG. 7

METHOD AND SYSTEM FOR LINE EXTRACTION IN DIGITAL INK

CROSS REFERENCE TO RELATED APPLICATION

The present application is a continuation of U.S. application Ser. No. 10/778,090 filed on Feb. 17, 2004, now issued U.S. Pat. No. 7,526,128, all of which are herein incorporated by reference.

TECHNICAL FIELD

The present invention relates to processing of handwritten digital ink documents, and in particular, to a method and system for line extraction in a digital ink sequence. The present invention also provides a means for line orientation estimation in a digital ink sequence.

CO-PENDING APPLICATIONS AND GRANTED PATENTS

Various methods, systems and apparatus relating to the present invention are disclosed in the following patents and co-pending applications filed by the applicant or assignee of the present invention:

| | | | | | |
|---|---|---|---|---|---|
| 7156289 | 7178718 | 7225979 | 09/575197 | 7079712 | 6825945 |
| 09/575165 | 6813039 | 7190474 | 6987506 | 6824044 | 6980318 |
| 6816274 | 7102772 | 09/575186 | 6681045 | 6678499 | 6679420 |
| 6963845 | 6976220 | 6728000 | 7110126 | 7173722 | 6976035 |
| 6813558 | 6766942 | 6965454 | 6995859 | 7088459 | 6720985 |
| 09/609303 | 6922779 | 6978019 | 6847883 | 7131058 | 09/721895 |
| 09/607843 | 09/693690 | 6959298 | 6973450 | 7150404 | 6965882 |
| 7233924 | 09/575181 | 09/722174 | 7175079 | 7162259 | 6718061 |
| 10/291523 | 10/291471 | 7012710 | 6825956 | 10/291481 | 7222098 |
| 10/291825 | 7263508 | 7031010 | 6972864 | 6862105 | 7009738 |
| 6989911 | 6982807 | 10/291576 | 6829387 | 6714678 | 6644545 |
| 6609653 | 6651879 | 10/291555 | 10/291510 | 10/291592 | 10/291542 |
| 7044363 | 7004390 | 6867880 | 7034953 | 6987581 | 7216224 |
| 10/291821 | 7162269 | 7162222 | 10/291822 | 10/291524 | 10/291553 |
| 6850931 | 6865570 | 6847961 | 10/685523 | 10/685583 | 7162442 |
| 10/685584 | 7159784 | 7068382 | 7007851 | 6957921 | 6457883 |
| 10/743671 | 7094910 | 7091344 | 7122685 | 7038066 | 7099019 |
| 7062651 | 6789194 | 6789191 | 6644642 | 6502614 | 6622999 |
| 6669385 | 6827116 | 6549935 | 6987573 | 6727996 | 6591884 |
| 6439706 | 6760119 | 09/575198 | 7064851 | 6826547 | 6290349 |
| 6428155 | 6785016 | 6831682 | 6741871 | 6927871 | 6980306 |
| 6965439 | 6840606 | 7036918 | 6977746 | 6970264 | 7068389 |
| 7093991 | 7190491 | 6982798 | 6870966 | 6822639 | 6474888 |
| 6627870 | 6724374 | 6788982 | 7263270 | 6788293 | 6946672 |
| 6737591 | 7091960 | 09/693514 | 6792165 | 7105753 | 6795593 |
| 6980704 | 6768821 | 7132612 | 7041916 | 6797895 | 7015901 |
| 7055739 | 7233320 | 6830196 | 6832717 | 7182247 | 7082562 |
| 6843420 | 10/291718 | 6789731 | 7057608 | 6766944 | 6766945 |
| 7289103 | 10/291559 | 10/291660 | 10/409864 | 7108192 | 7111791 |
| 10/683151 | 10/683040 | 6957768 | 09/575172 | 7170499 | 7106888 |
| 7123239 | 6982701 | 6982703 | 7227527 | 6786397 | 6947027 |
| 6975299 | 7139431 | 7048178 | 7118025 | 6839053 | 7015900 |
| 7010147 | 7133557 | 6914593 | 10/291546 | 6454482 | 6808330 |
| 6527365 | 6474773 | 6550997 | 7093923 | 6957923 | 7131724 |

The disclosures of these co-pending applications and granted patents are incorporated herein by reference. Some applications above have been identified by filing docket numbers, these will be substituted with the corresponding application numbers, once assigned.

BACKGROUND ART

Definitions

'Stroke' as used herein refers to a sequence of time-ordered two-dimensional data points forming a distinct part of a digital ink sequence.

'Stroke sequence' as used herein refers to a time-ordered sequence of strokes.

'Substroke' as used herein refers to segmented components of a stroke.

The increasing use of pen computing and the emergence of paper-based interfaces to networked computing resources (for example see: P. Lapstun, *Netpage System Overview*, Silverbrook Research Pty Ltd, 6 Jun. 2000; and, Anoto, "Anoto, Ericsson, and Time Manager Take Pen and Paper into the Digital Age with the Anoto Technology", Press Release, 6th Apr. 2000), has highlighted the need for techniques which are able to store, index, and search (raw) digital ink. Pen-based computing allows users to store data in the form of notes and annotations, and subsequently search this data based on hand-drawn queries. However, searching handwritten text is more difficult than traditional text (e.g. ASCII text) searching due to inconsistencies in the production of handwriting and the stylistic variations between writers.

The traditional method of searching handwritten data in a digital ink database is to first convert the digital ink database and corresponding search query to standard text using pattern recognition techniques, and then to match the query text with the converted standard text in the database. Fuzzy text searching methods have been described, see P. Hall and G. Dowling, "Approximate String Matching", *Computing Surveys*, 12(4), pp. 381-402, 1980, that perform text matching in the presence of character errors, similar to those produced by handwriting recognition systems.

However, handwriting recognition accuracy remains low, and the number of errors introduced by handwriting recognition (both for the database entries and for the handwritten query) means that this technique does not work well. The process of converting handwritten information into text results in the loss of a significant amount of information regarding the general shape and dynamic properties of the handwriting. For example, some letters (e.g. 'u' and 'v', 'v' and 'r', 'f' and 't', etc.) are handwritten with a great deal of similarity in shape. Additionally, in many handwriting styles (particularly cursive writing), the identification of individual characters is highly ambiguous.

Pen-based computing systems provide a convenient and flexible means of human-computer interaction. Most people are very familiar with using pen and paper. This familiarity is exploited by known systems which use a pen-like device as a data entry and recording mechanism for text, drawings or calculations which are quite naturally supported by this medium. Additionally, written ink is a more expressive format than digital text, and ink-based systems can be language-independent. Moreover, the majority of published information is distributed in paper form, and most people prefer reading printed material to reading information on screen-based terminals. However, online applications and publishing systems have a number of advantages over pen and paper, such as the ability to provide information on demand, document navigation via hypertext, and the ability to search and personalize the information.

The Netpage system, see Silverbrook Research, *Netpage System Design Description*, 8 Sep. 2000, provides an interactive paper-based interface to online information by utilizing pages of invisibly coded paper and an optically imaging pen. Each page generated by the Netpage system is uniquely identified and stored on a network server, and all user interaction with the paper using the Netpage pen is captured, interpreted, and stored. Memjet digital printing technology, see Silverbrook Research, *Memjet*, 1999, facilitates the on-demand printing of Netpage documents, allowing interactive applications to be developed. The Netpage printer, pen, and network infrastructure provide a paper-based alternative to traditional screen-based applications and online publishing services, and supports user-interface functionality such as hypertext navigation and form input.

Netpage is a three-tiered system comprising a client layer, a service layer, and an application layer, as depicted in FIG. 21. The client layer contains the Netpage pen, Memjet printer, and a digital ink relay. Typically, the printer receives a document from a publisher or application provider via a broadband connection, which is printed with an invisible pattern of infrared tags that encodes each page with a unique identifier and the location of the tag on the page. As a user writes on the page, the imaging pen decodes these tags and converts the motion of the pen into digital ink, see Silverbrook Research, *Netpage Pen Design Description,* 27 Apr. 2000. The digital ink is transmitted over a wireless channel to a relay base station, and then sent to the service layer for processing and storage.

The service layer consists of a number of services that provide functionality for application development, with each service implemented as a set of network servers that provide a reliable and scaleable processing environment. The infrastructure provides persistent storage of all documents printed using the Netpage system, together with the capture and persistent storage of all digital ink written on an interactive page. When digital ink is submitted for processing, the system uses a stored description of the page to interpret the digital ink, and performs the requested actions by interacting with the applications that generated the document.

The application layer provides content to the user by publishing documents, and processes the digital ink interactions submitted by the user. Typically, an application generates one or more interactive pages in response to user input, which are transmitted to the service layer to be stored, rendered, and finally printed as output to the user. The Netpage system allows sophisticated applications to be developed by providing services for document publishing, rendering, and delivery, authenticated transactions and secure payments, handwriting recognition and digital ink searching, and user validation using biometric techniques such as signature verification.

As a result of the progress in pen-based interface research, handwritten digital ink documents, represented by time-ordered sequences of sampled pen strokes, are becoming increasingly popular [J. Subrahmonia and T. Zimmerman: Pen Computing: Challenges and Applications. *Proceedings of the ICPR,* 2000, pp. 2060-2066]. This representation of handwriting is called on-line as opposed to off-line where documents are represented by digital images. On-line handwriting typically involves writing in a mixture of writing styles (e.g. cursive, discrete, run-on etc.), a variety of fonts and scripts and different layouts (e.g. mixing drawings with text, various text line orientations etc.). Although it is possible to process (e.g. recognise) the handwritten data directly, i.e. as it is output from the device, the processing system would have to account for all the variability in the data—an admittedly difficult task. To reduce the variability in the data, a document preprocessing step is typically used prior to further operations on the data. One of the tasks of document preprocessing is to identify document (here handwritten page) parts which share some common attribute, e.g. they contain ink that belongs to a text line, or it has the same font size, or it is a drawing, etc. Another task is to remove some of the variability by normalising, e.g. for size, rotation or slant.

The present invention relates to text line extraction, that is segmenting out document parts that constitute lines of text. Given the text line segments, a skew may be estimated, i.e. the orientation of a geometric line parallel to the text line's accepted baseline with respect to the horizontal axis. Note that in unconstrained handwriting the baseline is not well defined and various approximations are typically accepted (e.g. the least squares approximation line fit through the local y-minima of strokes of horizontal lines or line parts). The normalisation (rotation) of digital ink to correct for the skew angle is called deskewing;

Most probably due to the difficulties of the handwritten character/word classification task itself and secondly due to the relatively slow (until recently) evolution of pen-based devices operating directly on digital ink, research in the past two decades has not given too much attention to line extraction and deskewing for unconstrained on-line handwriting (the reader should distinguish line extraction from line segmentation which is often used to denote segmenting a text line into words and/or characters). In fact, only a single approach exclusively dealing with this problem was encountered in the literature [E. Ratzlaff, "Inter-line distance estimation and text line extraction for unconstrained on-line handwriting", *Proceedings of the 7th International Workshop on Frontiers in Handwriting Recognition,* Sep. 11-13, 2000, Amsterdam, Nijmegen: International Unipen Foundation, ISBN 90-76942-01-3, pp. 33-42], making use of temporal stroke relationships for line extraction. The method has been patented [M. Perrone and E. Ratzlaff, "Spatial sorting and formatting for handwriting recognition", U.S. Pat. No. 6,333,994, IBM Corporation, December 2001] and an application has been described [A. Jain, A. Namboodiri and J. Subrahmonia, "Structure in On-line Documents", *Proceedings of the 6th International Conference on Document Analysis and Recognition,* pp. 844-848, Seattle Wash., September 2001].

Unfortunately, Ratzlaff's approach poses restricting requirements as to the accepted writing style, thus limiting the applicability of the method to pages written in a single font size, with a constant inter-line distance between not significantly overlapping lines. Furthermore, lines are assumed to be approximately horizontal as the method is very sensitive to even small skew angles (2 degrees and above). Finally, the proposed algorithm relies on a number of manually selected parameters although, as the author argues, these could be automatically selected as a result of a training process (assuming that training data is available).

Similar limitations are common to off-line handwriting methods which are briefly discussed for the sake of completeness. Off-line approaches to handwritten line extraction and deskewing have to account for, apart from the writer's style variability, the global geometric transformation (especially the global skew angle) introduced by the imaging process. Partially due to the difficulty in telling the imaging skew from intentional angled writing, almost all methods have assumed that the original writing was meant to be horizontal, therefore a document page like the one shown in FIG. 4 may be problematic to handle. In addition, a common requirement in off-line methods is that all imaged ink is subject to the same skew—an assumption often violated (think of the image of two adjacent book pages in 2-column format scanned together by pressing the spine of the book). Moreover, many methods restrict the acceptable line orientation to a specified limited range (e.g. 45 degrees). A further limitation of off-line methods, mainly due to the lack of temporal information, is that not only are they sensitive to the overlap between lines but also they often require a minimum inter-line distance, larger than the maximum inter-stroke distance. Very often, a significant amount of writing is required for accurate results to be obtained. Finally, off-line methods are much more computationally expensive than on-line ones.

Despite their limitations, off-line methods have exploited a number of algorithms. In particular, variations of the projection profile method have been very popular for removing the global page skew of non-overlapping horizontal lines [H. Baird, "The Skew Angle of Printed Documents", *Proceedings of Society of Photographic Scientific Engineering*, 1987, Vol. 40, pp. 21-24], [F. Venturelli, Z. Kovacs-Vajna, "A Successful Technique for Unconstrained Hand-Written Line Segmentation", *Progress in Handwriting Recognition*, Ed. A. C. Downtown and S. Impedovo, World Scientific, pp. 563-568, 1997], [T. Steinherz, N. Intrator and E. Rivlin, "Skew Detection via Principal Components Analysis", *Proceedings of the 5th International Conference on Document Analysis and Recognition*, 1999, pp. 153-156]. Local application of the projection profile method is a more accurate approach, however it is computationally expensive if a significant number of projections at different angles have to be computed for every local ink segment. The Hough transform has been extensively used for line extraction from document images [S. Srihari and V. Govindaraju. "Analysis of textual images using the Hough transform", *Machine Vision and Applications*, 2:141-153, 1989], [L. Likforman-Sulem, A. Hanimyan, C. Faure, "A Hough based algorithm for extracting text lines in handwritten documents", *Third International Conference on Document Analysis and Recognition* (Volume 2), pp. 774-777, Aug. 14-15, 1995]. [Y. Pu and Z. hi, "A Natural Learning Algorithm based on Hough Transform for Text Lines Extraction in Handwritten Documents", *Eighth International Workshop on Frontiers in Handwriting Recognition*, KAIST Campus, Taejon City, Korea, Aug. 12-14, 1998, pp. 637-646], [J. Liang, I. Phillips and R. Haralick, "A Statistically based, Highly Accurate Text-line Segmentation Method", *Proceedings of the 5th International Conference on Document Analysis and Recognition*, 20-22 Sep. 1999, Bangalore, India, pp 551-554]. Local application of the Hough transform for skewed horizontal lines [Y. Pu and Z. Shi, "A Natural Learning Algorithm based on Hough Transform for Text Lines Extraction in Handwritten Documents", *Eighth International Workshop on Frontiers in Handwriting Recognition*, KAIST Campus, Taejon City, Korea, Aug. 12-14, 1998, pp. 637-646] is interesting. Using the Hough transform, short lines may be difficult to extract due to the limited number of points and therefore limited orientation information. An optimal quantisation of the $(\rho,\theta)$ transformation space would improve both speed and accuracy in detecting lines of a known fixed font size, however estimating the font size from a handwritten page of text lines with arbitrary orientation before line extraction is a yet unsolved problem. Finally, no systematic experiments have been presented using the Hough transform for lines of different arbitrary orientation within the same page and its speed for line extraction has not been reported.

Clustering of ink into stroke groups corresponding to text lines has also been proposed, using a nearest-neighbour clustering algorithm or the shortest spanning tree of the graph of connected components [S. Abuhaiba, S. Datta, M. Holt, "Line extraction and stroke ordering of text pages", *Third International Conference on Document Analysis and Recognition*, Volume 1, pp. 390-394, Aug. 14-15, 1995]. Methods based on connected component clustering assume that the inter-stroke distance is smaller than the inter-line distance, something that cannot be guaranteed for handwritten documents. Some methods require a training set to generate probabilistic models of text line geometry on a page [J. Liang, I. Phillips and R. Haralick, "A Statistically based, Highly Accurate Text-line Segmentation Method", *Proceedings of the 5th International Conference on Document Analysis and Recognition*, 20-22 Sep. 1999, Bangalore, India, pp 551-554]. Such an approach is not generally applicable in the unconstrained on-line handwriting case due to both the difficulty in modelling user behaviour and the lack of a reliable ground-truthing protocol for such data. A thinning-based image processing method has been proposed [S. Tsuruoka, Y. Adachi and T. Yoshikawa, "The segmentation of a text line for a handwritten unconstrained document using thinning algorithm", *Proceedings of the Seventh International Workshop on Frontiers in Handwriting Recognition*, Sep. 11-13, 2000, Amsterdam, pp. 505-510].

A method to extract curved horizontal lines based on local baseline segment estimates has been described [M. Feldbach and K. Tönnies. "Line Detection and Segmentation in Historical Church Registers", In *Sixth International Conference on Document Analysis and Recognition*, pages 743-747, Seattle, USA, September 2001] for a specific type of handwritten document. A vertical descend method [A Hennig, N Sherkat and R J Whitrow, "Zone Estimation for Multiple Lines of Handwriting Using Approximating Spline Functions", *Progress in Handwriting Recognition*, ed. A. C. Downton, S. Impedovo, pp. 63-67, World Scientific, Singapore, June 1997, ISBN 981-02-3084-2] requires horizontal lines of approximately same length. Texture-based, inter-line cross-correlation, direct least squares and Fourier-based methods have also been studied for printed text document processing [O. Okun, M. Pietikäinen and J. Sauvola, "Robust Document Skew Detection Based on Line Extraction", *Proceedings of the 11th Scandinavian Conference on Image Analysis*, 1999, Jun. 7-11, Kangerlussuaq, Greenland, pp. 457-464]. However, the applicability of such methods in handwriting applications is limited due to the non-uniformity of the data.

Local processing is of importance for on-line handwriting data since one can reasonably assume that attributes like the font and the line orientation will not change significantly within most local spatial and/or temporal windows. Another advantage of local processing is that when new ink is added to a page, re-computation of the existing ink is not required.

Methods that utilise contextual information such as type of script, writing order or application environment are not considered. Although effective use of such knowledge would be beneficial for a specialised system, it may not be available for general-purpose systems like those designed for digital notepads.

A new method or system is needed for on-line handwritten text line extraction allowing orientation estimation without the limitations of Ratzlaff's method [E. Ratzlaff, "Inter-line distance estimation and text line extraction for unconstrained on-line handwriting", *Proceedings of the 7th International Workshop on Frontiers in Handwriting Recognition*, Sep. 11-13 2000, Amsterdam, Nijmegen: International Unipen Foundation, ISBN 90-76942-01-3, pp. 33-42], i.e. able to detect lines in any orientation and possibly changing font characteristics and writing style.

This identifies a need for a method or system for line extraction in a digital ink sequence which overcomes or at least ameliorates problems inherent in the prior art.

The reference to any prior art in this specification is not, and should not be taken as, an acknowledgment or any form of suggestion that such prior art forms part of the common general knowledge.

DISCLOSURE OF INVENTION

Generally, the present invention seeks to provide a method or system to segment a digital ink sequence of handwritten text data into parts where each part corresponds to a text line and text lines are written in arbitrary positions, orientations and writing styles on the same page. The digital ink sequence may additionally contain arbitrary drawings and other non-text sequences embedded in the digital ink stream.

In another broad form, the present invention seeks to provide a working algorithm that takes as input a sequence of digital ink strokes from an electronic writing device, detects text line breaks and segments the input sequence into subsequences corresponding to text lines by exploiting the angular differences of spatiotemporal properties of neighbouring parts of the digital ink.

A significant difference between the present method compared to those reviewed hereinbefore is that it can extract lines of different lengths, fonts and arbitrary orientations within the same page (see an example in FIG. 4). The advantages of the present invention include the following points.

(i) No assumptions are made about the relative positions of lines allowing for touching or even overlapping lines. Moreover, inter-line distances may vary arbitrarily throughout a handwritten page of text.
(ii) Training data and external (domain or application) information is not required.
(iii) Processing can be incremental so that when ink is added to a page the existing lines need not be re-extracted.
(iv) Line extraction and orientation estimation is computationally inexpensive so that is does not slow down further ink processing.

In a broad form, the present invention seeks to provide a method of line extraction in a digital ink sequence of handwritten text data points, the method including the steps of:
  obtaining a stroke sequence comprised of a sequence of strokes;
  segmenting the strokes into a sequence of substrokes by applying a stroke segmentation algorithm;
  calculating angular differences between neighbouring substrokes, or groups of substrokes, in the sequence of substrokes; and,
  determining the positions of the extrema of the angular differences, thereby identifying the substrokes at line breaks and enabling line extraction.

In a further broad form, the present invention seeks to provide a method of line extraction in an on-line digital ink sequence of handwritten text data points, the method including the steps of:
  obtaining a stroke sequence comprised of a sequence of strokes;
  removing small strokes less than a threshold length;
  segmenting the strokes into a sequence of substrokes by:
    (A) computing a relative angle for each line segment connecting successive stroke data points; and,
    (B) segmenting the stroke into substrokes if the difference between successive relative angles is greater than a preset threshold; and,
  identifying the substrokes at line breaks, thereby facilitating line extraction, by:
    (A) computing N-neighbourhood centroids;
    (B) computing angular differences between N-neighbouring substrokes, or groups of substrokes; and,
    (C) computing local maxima of the angular differences in the sequence of substrokes.

In still a further broad form, the present invention seeks to provide a system for line extraction in a digital ink sequence of handwritten text data points, the system comprising:
  an input device to obtain a stroke sequence comprised of a sequence of strokes;
  a processor in communication with the input device and adapted to:
    (A) segment the strokes into a sequence of substrokes by applying a stroke segmentation algorithm;
    (B) calculate angular differences between neighbouring substrokes, or groups of substrokes, in the sequence of substrokes; and,
    (C) determine the positions of the extrema of the angular differences, thereby identifying the substrokes at line breaks enabling line extraction.

In still a further broad form, the present invention seeks to provide a searchable electronic filing system including:
  a. a first database for storing a digital representation of each of a plurality of printed documents, each printed document including machine-readable identification data which distinguishes it from the others;
  b. a second database for storing annotation digital ink, the annotation digital ink representing at least one physical handwritten annotation on at least one of the printed documents;
  c. a processor configured to:
    i. segment the annotation digital ink into lines using the method of claim 1;
    ii. accept a digital ink query;
    iii. match the digital ink query against at least some of the annotation digital ink in the second database, to thereby identify a corresponding one of the documents in the first database.

BRIEF DESCRIPTION OF FIGURES

The present invention should become apparent from the following description, which is given by way of example only, of a preferred but non-limiting embodiment thereof, described in connection with the accompanying figures.

FIG. 3 illustrates examples of scripts similar to Latin (from top: English, French, Greek, Russian and Italian);

FIG. 4 illustrates an example of unconstrained handwritten text on a note-taking device;

FIG. 5 illustrates how stroke segmentation happens at points where the current direction is significantly different either from the last direction or the initial direction of the current substroke. A schematic example of such a segmentation point is B (current direction significantly different from the initial direction) whereas point A represents a point of continuity;

FIG. 6 illustrates the substrokes of an extract from the original ink of FIG. 4;

FIG. 7 illustrates neighbouring straight line segments of the writing trajectory on the same text line (line a-b or d-e) having similar orientation, different from the orientation of segments such as segment c which connects points from different lines (A and B);

FIG. 12 illustrates two examples from the 14 handwritten pages used in Experiment B;

FIG. 13 illustrates the only false negative (left) and a false positive (right) from those recorded in experiments A and B;

MODES FOR CARRYING OUT THE INVENTION

The following modes are described in order to provide a more precise understanding of the subject matter of the present invention.

Preferred Embodiment

Figure 1:
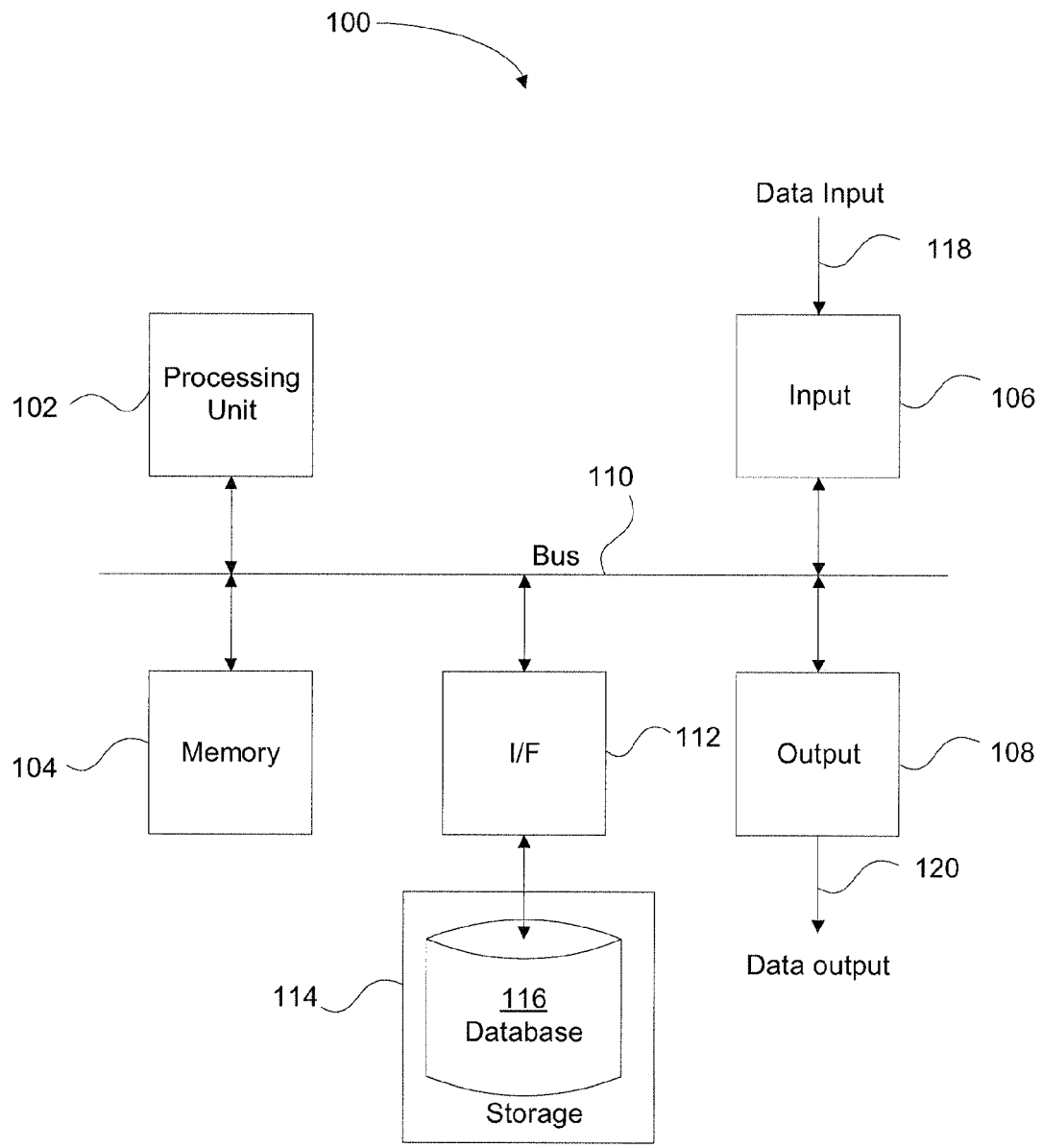
FIG. 1 illustrates a functional block diagram of a processing system embodiment of the present invention.

A particular embodiment of the present invention can be realised using a processing system, an example of which is shown in FIG. 1. In particular, the processing system 100 generally includes at least a processor or processing unit 102, a memory 104, an input device 106 and an output device 108, coupled together via a bus or collection of buses 110. An interface 112 can also be provided for coupling the processing system 100 to a storage device 114 which houses a database 116. The memory 104 can be any form of memory device, for example, volatile or non-volatile memory, solid state storage devices, magnetic devices, etc. The input device 106 receives data input 118 and can include, for example, digital notepad etc. The output device 108 produces data output 120 and can include, for example, a display device, monitor, printer, network card, etc. The storage device 114 can be any form of storage means, for example, volatile or non-volatile memory, solid state storage devices, magnetic devices, etc.

In use, the processing system 100 is adapted to allow data or information to be stored in and/or retrieved from the database 116. The processor 102 receives digital ink via the input device 106 and may display or transmit results via the output device 108. It should be appreciated that the processing system 100 may be any form of processing system, computer terminal, server, specialised hardware, or the like.

Figure 2:
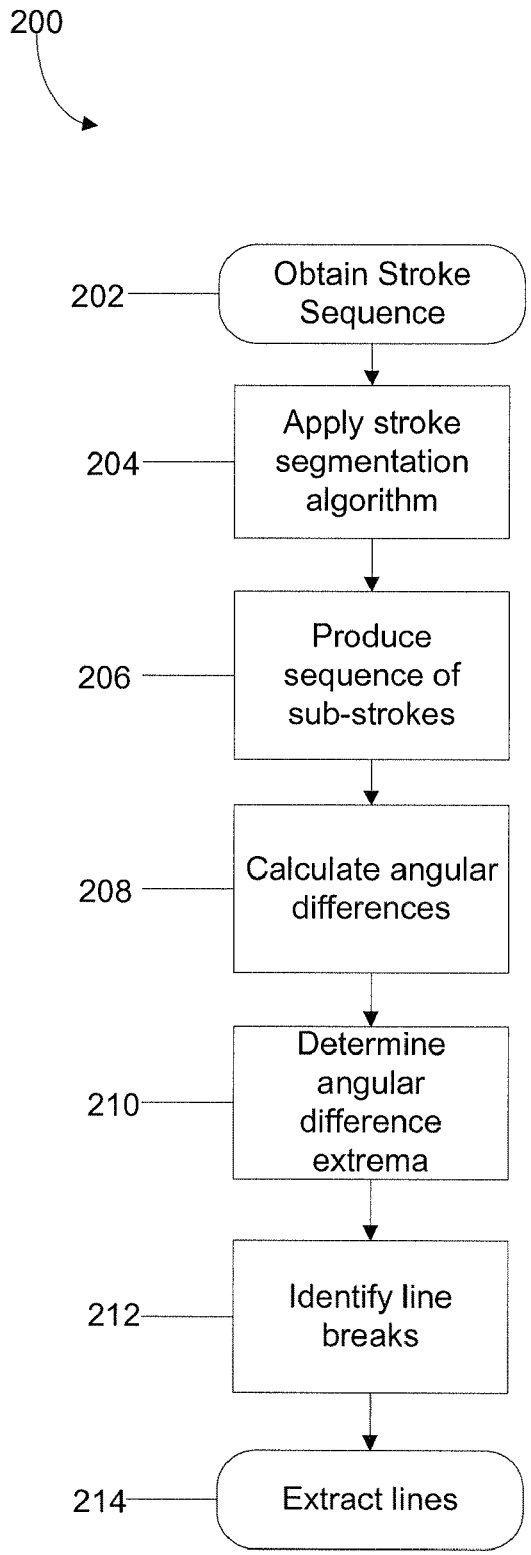
FIG. 2 illustrates a broad method of the invention.

Referring to FIG. 2, the preferred method 200 is illustrated. At step 202 the stroke sequence is obtained. At step 204 the stroke segmentation algorithm is applied to the stroke sequence. Next, at step 206, the stroke segmentation algorithm results in a sequence of substrokes. After this, at step 208, angular differences are calculated. Calculations are explained in further detail hereinafter. At step 210 the extrema, preferably the maxima, of the angular differences between substrokes are determined. At step 212 line breaks are identified based on the angular difference extrema determined in the preceding step. At step 214, after the line breaks have been identified, the lines may be extracted in the stroke sequence.

In the preferred method, a page of text is represented by a stroke sequence. To reduce the number of points in the data (and therefore processing time) as well as the influence of outlier points, for each stroke a reference point is defined, its (mean) centroid is used in some subsequent computations. The trajectory of writing is defined as the polyline generated by connecting the strokes reference points in the order they were input. Observation of the trajectory of writing in a number of text pages suggests that the orientation (angle with respect to the horizontal axis) of segments connecting the centroid of the last few reference points of one line and the centroid of the first few reference points of the next one have a significant difference from the orientation of segments connecting neighbouring point sets belonging to the same line before and after the line break (see FIG. 7 for an illustration).

Figure 20:
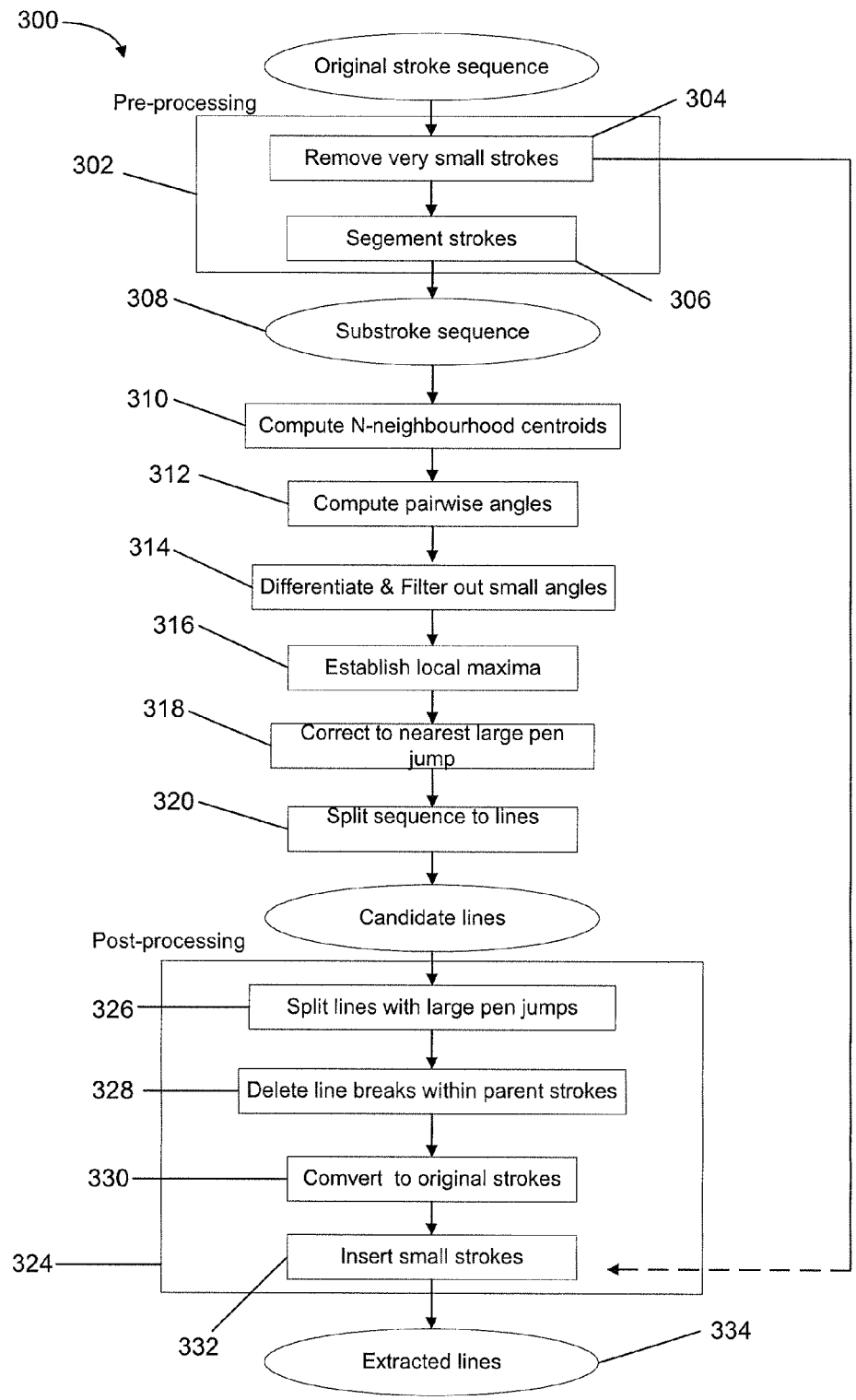
FIG. 20 illustrates a schematic diagram of a preferred method of the invention.
Figure 21:
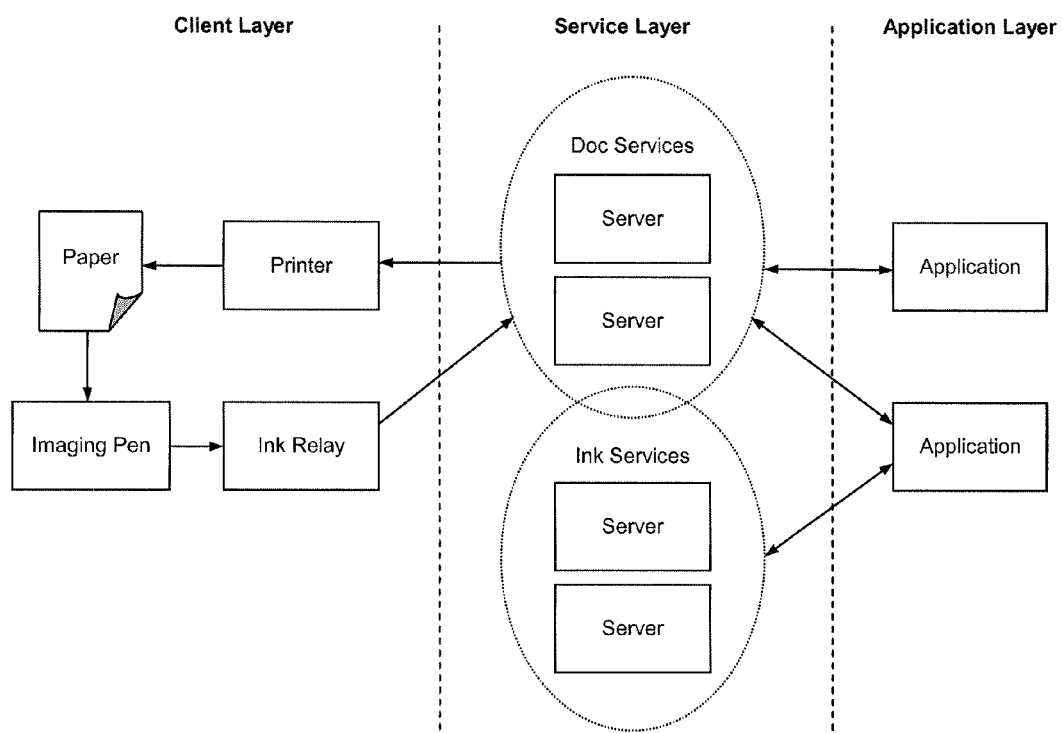
FIG. 21 (Prior Art) illustrates the Netpage system architecture

Referring to FIG. 20, a more detailed method 300 is now presented.

Pre-processing 302

A stroke sequence may also be pre-processed. In pre-processing, first of all, points with square Euclidean distance less than E from the previous point are removed 304 from the original ink sequence in order to remove almost identical points which increases both accuracy and efficiency. In the present implementation, E is set to be the median inter-point square Euclidean distance calculated over all successive point pairs in the stroke sequence. To eliminate a number of noisy, small strokes (e.g. diacriticals) which may influence the algorithm's performance, strokes whose maximum bounding rectangle dimension is less than S (here 0.4) of the maximum dimension of their previous and the next stroke are ignored from subsequent processing. They can be added to the final extracted lines during post-processing. The strokes kept may vary in size and sometimes a whole line may consist of a single stroke. The trajectory of writing for such a line would be a single point (the stroke's centroid) which would not provide accurate evidence for computing angle differences during line extraction. To generate more reference points for complex strokes it is preferable to segment all page strokes into parts called substrokes. Stroke segmentation into substrokes 306 is performed using the angular extrema-based method described hereinafter. The resulting substrokes for an extract from the ink in FIG. 4 are shown in FIG. 6. After segmentation, the sequence of substrokes is considered for subsequent computations.

To segment strokes into substrokes 306 the following algorithm is used. First, the stroke points are smoothed using a low pass filter with a three-point kernel with coefficients [1/6,4/6,1/6] in order to reduce the effect of writer and/or pen instability. Subsequently, the direction (counter-clockwise angle from the horizontal axis) of every line segment connecting successive stroke points is computed, quantised to one of 16 levels, converted to a first quadrant value and attributed to the first point of each segment. An initial segmentation into candidate substrokes is then performed. Candidate substrokes start at the first stroke point and at computed segmentation points. A stroke point is a segmentation point if its direction is either significantly different from that of the previous point or if the previous direction is significantly different from the first point in the current candidate substroke (see illustration in FIG. 5). Candidate substrokes are merged together if the substroke direction difference of successive substrokes is less than a threshold in order to avoid segmenting small and unusually noisy bumps on the stroke curve. Substroke direction is the quantised angle of the line segment connecting the end points of the substroke. The stroke segmentation algorithm is described step-by-step below:

Let Substrokes be an empty set of substrokes
Let InitDir be the direction of the first stroke point
Let LastDir=InitDir be the last processed stroke point direction
Let CurrentSubstroke be an empty substroke
For each stroke point P
   Let CurrentDir be the direction of P
   If (|CurrentDir−LastDir|>T1 AND |LastDir−InitDir|>T2)
   Add CurrentSubstroke to Substrokes
   Set InitDir=LastDir=CurrentDir

```
Empty CurrentSubstroke
End<if>
else
   Add P to CurrentSubstroke
   Set LastDir=CurrentDir
End<else>
End<for each>
Let FinalSubstrokes be an empty set of substrokes
Move the first element of Substrokes to FinalSubstrokes
For each remaining substroke s in Substrokes
   Compute the direction d of the segment connecting the first
       and last point of s
   If (d<T3)
      Append all points of s to the last substroke entered in
         FinalSubstrokes
   End<if>
   else
      Add s as a new entry in FinalSubstrokes
   End<else>
End<for each>
Return FinalSubstrokes and terminate.
```

The low pass filter coefficients, the quantisation levels and the threshold values associated with stroke segmentation are empirically chosen to fixed values independently of the data sets used in our experiments. In particular, T1 is set to 1, T2 is set to 2 and T3 is set to 3 quantisation levels. Since neither the number nor the exact position of segmentation points is critical in our application, the optimality of the selected threshold values was not investigated.

Line Break Detection

In this step, the angle change along the trajectory of writing is computed as follows. The trajectory of writing of the substroke sequence 308 often has a ragged form and possibly one or more backward pen jumps, e.g. for adding diacriticals. To reduce intra-line trajectory variability as well as sensitivity to backward pen jumps while computing the angle difference between neighbouring line segments at a given (origin) substroke, groups of N substrokes (temporally) before and N substrokes after a given (origin) substroke are considered. These groups are termed the N-neighbourhood centred at the origin substroke. In the present implementation N was fixed to 8 which lead to successful experiments using simple test data. The centroid of the previous and the next substroke neighbourhood are computed 310 and the lines connecting them with the origin substroke centroid are used for the computation of the angle difference 312 at the origin substroke. This process is repeated for each substroke in the sequence. The sensitivity of the method to the parameter N is studied later.

Figure 8:
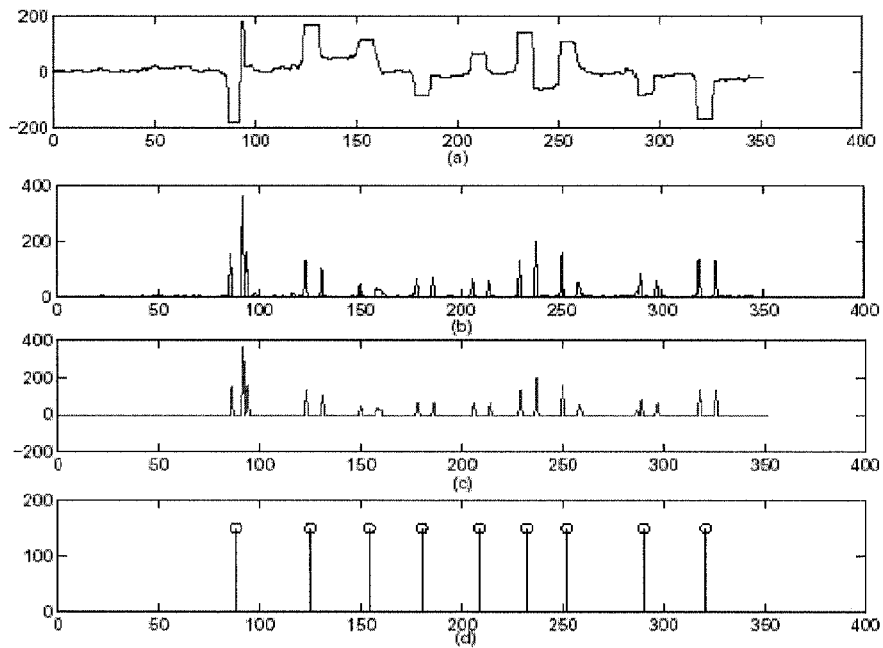
FIG. 8 illustrates (a) the connecting segments angle difference of the ink in FIG. 2 plotted over stroke input order (b) the differentiated signal (c) the previous signal ignoring differences below 20 degrees (d) the selected local maxima (peaks)

From the angle change data, viewed as a one-dimensional function of substroke input order, the significant angle changes are computed 312. First, angle changes below A (here 20) degrees are ignored 314 (replaced with 0) as they typically correspond to intra-line variations. Then, the local maxima of the absolute values of the differentiated signal are computed 316 using a simple technique, selecting values which are greater than all other values in a window of size W centred at the candidate local maximum. In the present implementation, W was chosen to be equal to the stroke neighbourhood size N (8) assuming that a line will contain at least N/2, (here 4) substrokes. In the sensitivity analysis later in this text it is shown that the value of W does not critically influence performance. The positions of the local maxima in the stroke input time domain correspond to the substrokes at the estimated line breaks. The position of the local maximum (the stroke with the maximum angle between the neighbouring point sets) can be any substroke in the last N of one line and the next N in the next line. Therefore, the line break position is corrected to the one before the largest pen jump in the N-neighbourhood centred at the initial line break estimate. The corrected line breaks 318 are finally used to split the original stroke sequence into text lines 320. FIG. 8 shows the graphs associated with the steps described above for the example of FIG. 4. The computed angle between successive stroke neighbourhood centroids is plotted in (a) while (b) shows the differentiated version of (a). Subplot (c) presents the differentiated signal after setting all values less than A (20) degrees to zero. The computed positions of the local maxima of (c) are shown in (d).

Post-processing 324

Figure 9:
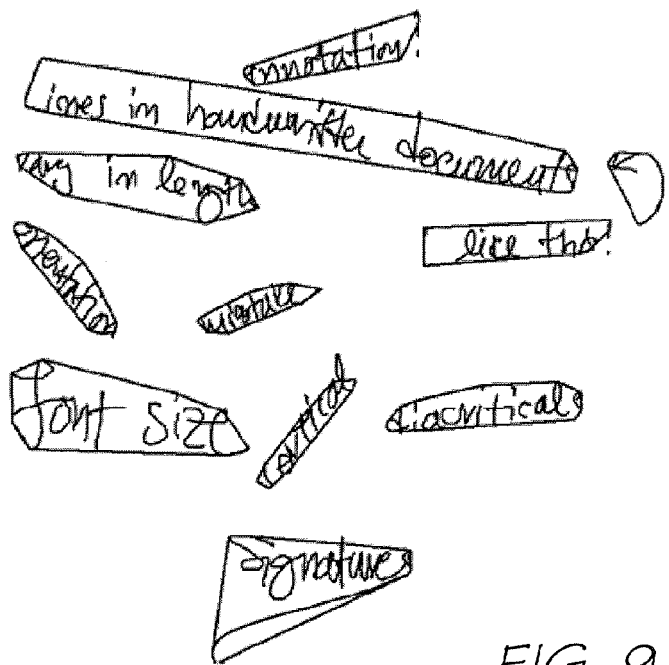
FIG. 9 illustrates the extracted lines of ink shown in FIG. 4.

During line extraction, only the angle of neighbouring stroke groups is used. This often results in merged text lines with similar orientations separated by large pen jumps 326 which usually indicate line breaks (e.g. the space between columns of text). To address this, for each substroke of every line (reference substroke), the K (here 3) previous and K next substrokes are considered. As in line break detection, more than one substroke is considered in order to avoid misinterpretation of pen jumps related to adding diacriticals. The reference substroke is considered part of the previous group which in fact has K+1 strokes. If the Euclidean distance of the closest point pair between the previous and the next substroke group is greater than D, a line break is inserted after the reference substroke. In the present implementation D was set to be J (here 20) times the maximum dimension of the average substroke size of the line under consideration. Subsequently, any line breaks between substrokes of the same parent stroke are removed 328. The verified lines are then converted to the original parent strokes 330 and the small strokes which were ignored at preprocessing are re-inserted at the most likely lines 332 using the following algorithm. If both the previous and next stroke of an ignored stroke are parts of the same extracted line then the ignored stroke is assigned to that line. In any other case, the minimum Euclidean distance M is computed between all point pairs between the ignored stroke and each line. The ignored stroke is assigned to the line with the minimum M and the process terminates 334. Note that none of the original ink points output from the pen device are discarded in the returned lines. The extracted lines for the example in FIG. 4 and their (approximate) convex hulls are shown in FIG. 9.

Line Orientation Estimation

Figures 10, 11:
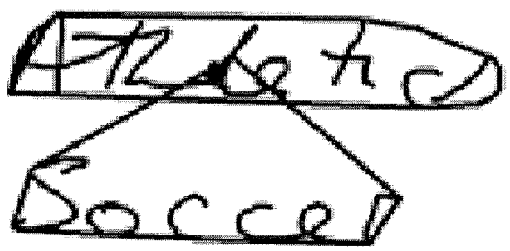
FIG. 10 illustrates the text line orientations estimated by the algorithm.
FIG. 11 illustrates two examples from the 14 handwritten pages of Experiment A.
Figure 14:
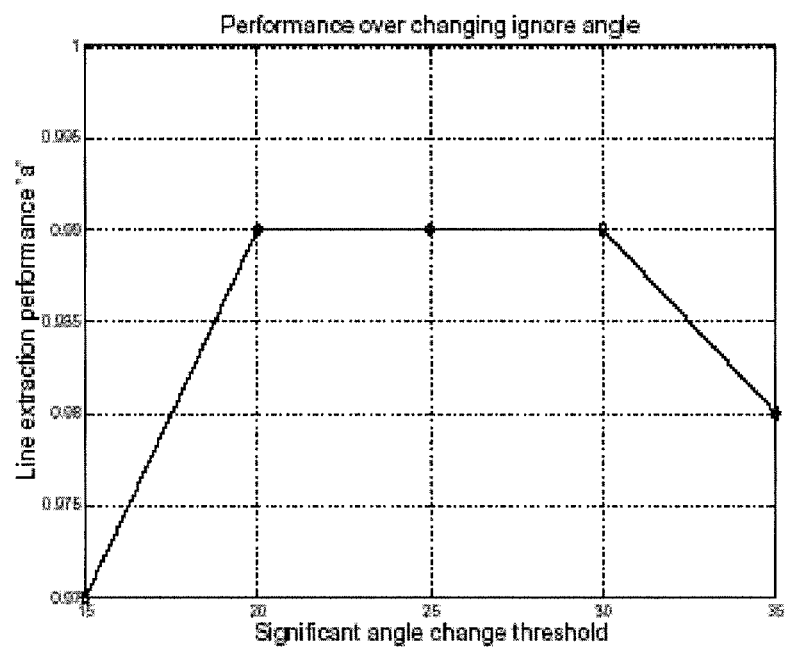
FIG. 14 illustrates some of the lines for which the orientation estimation failed.
Figure 15:
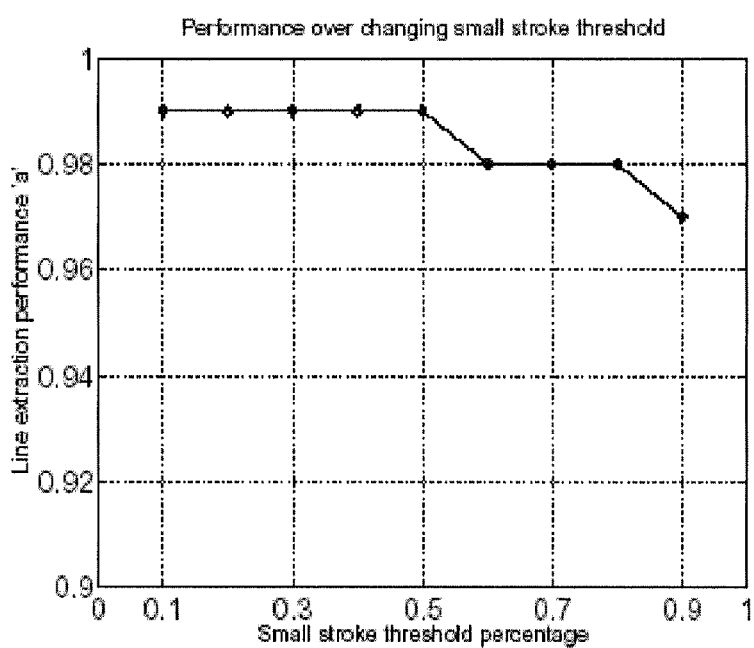
FIG. 15 illustrates an example of a segmented page from those used in Experiment A.
Figure 16:
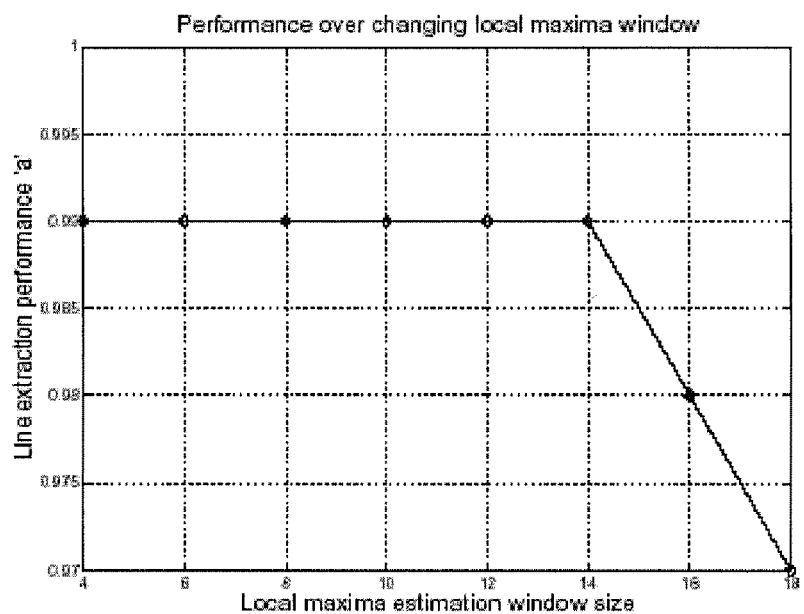
FIG. 16 illustrates line extraction performance over changing significant angle threshold.
Figure 17:
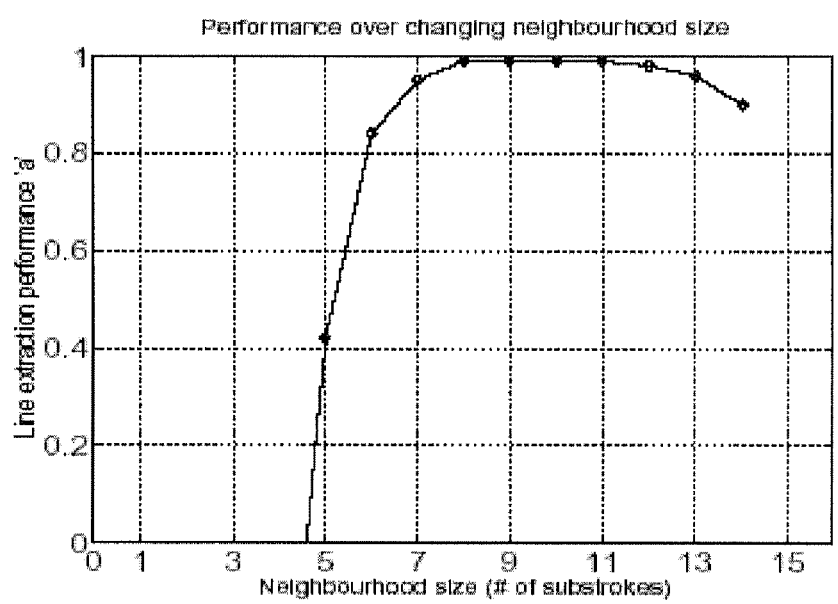
FIG. 17 illustrates line extraction performance over changing small stroke size threshold.
Figure 18:
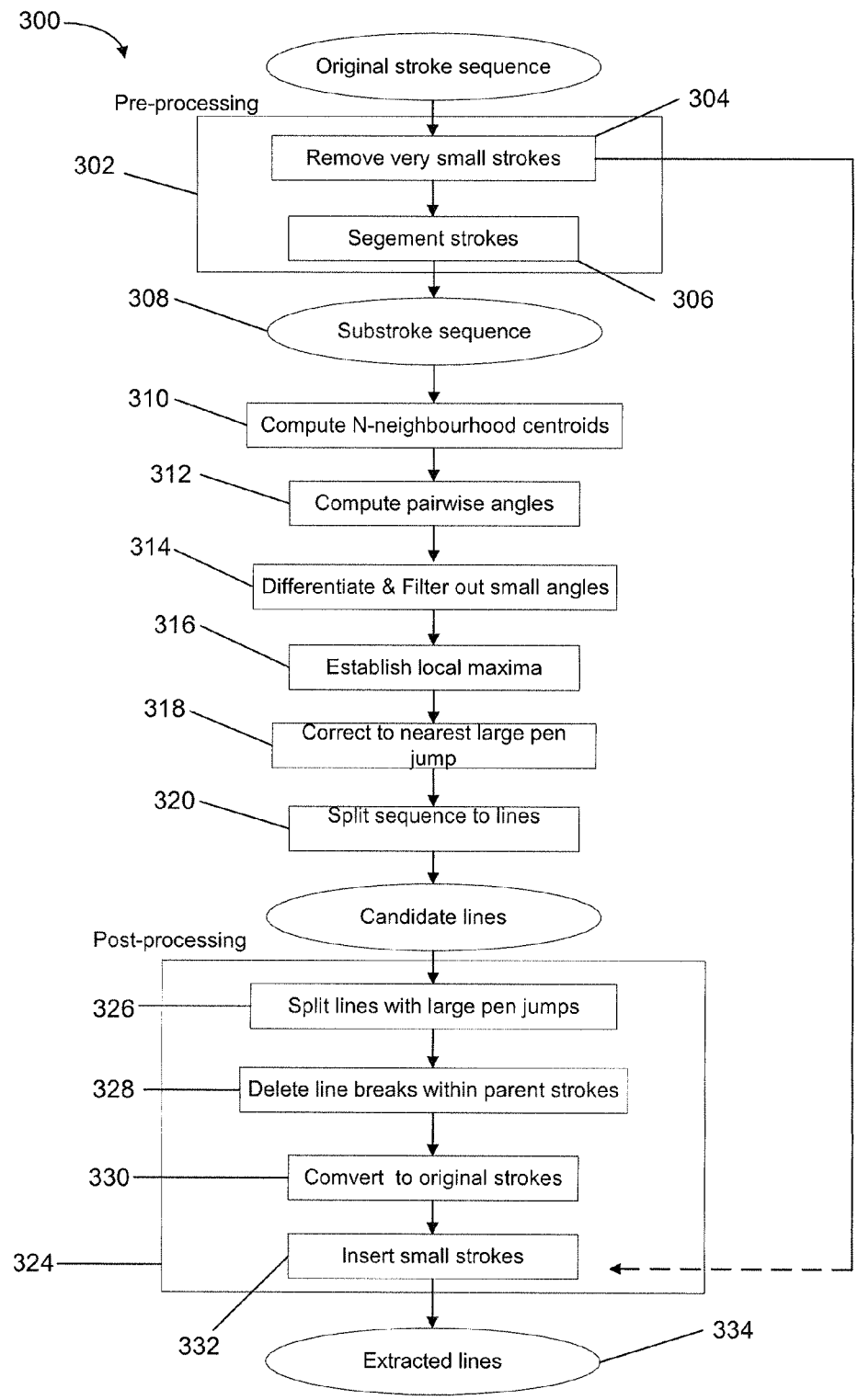
FIG. 18 illustrates line extraction performance over changing local maxima estimation window size.
Figure 19:
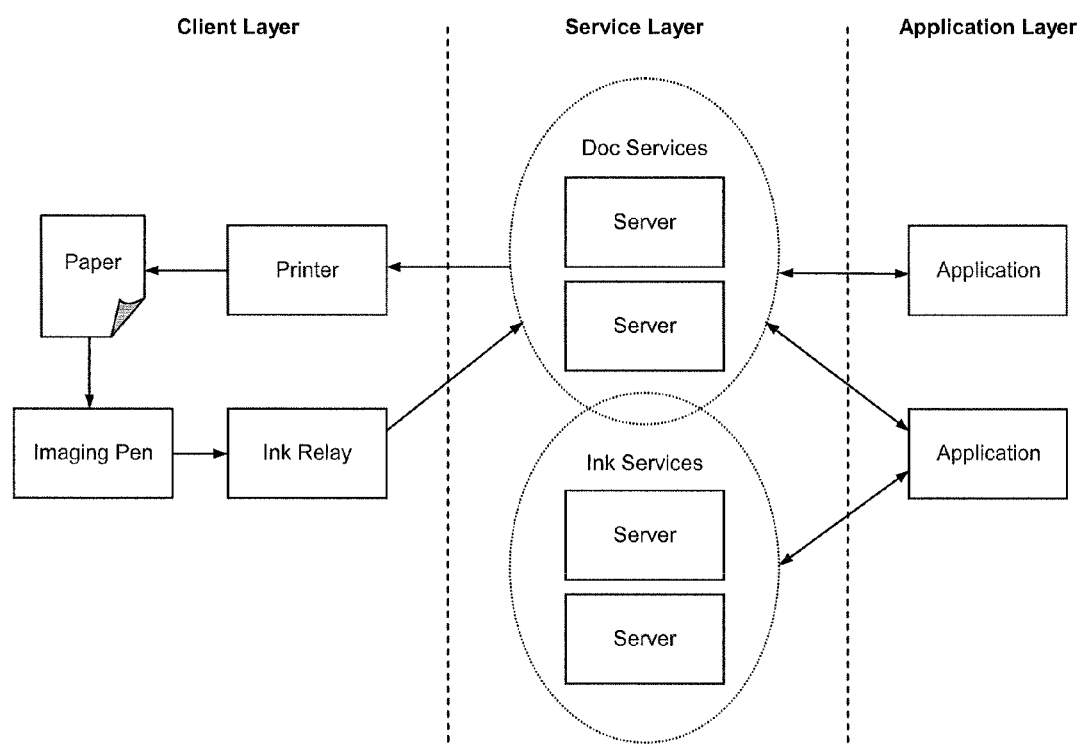
FIG. 19 illustrates line extraction performance over changing neighbourhood size N.

Line orientation is computed as the orientation of the first (principal) eigenvector of the set of line points with respect to the horizontal axis. The computation of the eigenvectors was performed using the EISPACK software library [B. Smith, J. Boyle, J. Dongarra, B. Garbow, Y. Ikebe, V. Klema, and C. Moler, "Matrix Eigensystem Routines—EISPACK Guide", *Lecture Notes in Computer Science*, Vol. 6, 2nd edition, Springer-Verlag, Berlin, 1976]. The computed orientations for the ink in FIG. 4 are shown in FIG. 10. The computed orientations do not take into account the direction of writing and they may be output as the supplementary (180 degrees difference) of the "true" angles. To amend this, an initial rotation is performed using the estimated angle so that the line is horizontal. The differences of the abscissa of the first points of the strokes of the rotated line with the abscissa of the first point of the first stroke of the line are then recorded. If the number of positive differences is less than the number of negative differences then the line is further rotated by 180 degrees clock-wise otherwise the initial rotation is accepted. The exact positions of the text baselines, not computed in this work, can be achieved using, for example, a zoning method on the segmented and deskewed text lines. For display purposes, the horizontal segments shown in FIG. 10 were automatically positioned so that they pass through the centroid of the first 3 strokes of each line and their end points are the intersection points of the corresponding geometric line with the text line's bounding rectangle.

FURTHER EXAMPLE

The following example provides a more detailed discussion of a specific embodiment of the present invention and presents experimental results arising from this embodiment. The example is intended to be merely illustrative and not limiting to the scope of the present invention.

Three experiments were conducted using ink data collected with a CrossPad Portable Digital Notepad tablet (model CP41001-01XPAD).

Experiment A

To test the performance of the method for line extraction, fourteen (14) people were asked to copy the contents of a selected text page in their own handwriting and without necessarily preserving the line breaks, text line orientations and relative positions of the example page. No extra care was required by the writers regarding the writing style, therefore the data presented a good mix of cursive and discrete writing as well as a mixture of fonts. The example page copied by the writers contained a printed passage written horizontally in the middle of the page, a list of sport names written anywhere on the page (in list format) in arbitrary orientation and a number of annotation words/sentences written around the central passage in arbitrary positions and orientations. The data consisted of 415 lines or 401 line breaks (excluding the beginning and end of page). The exact positions of the line breaks (the index of the temporally last stroke of each line) were manually identified and recorded as ground truth. Note, that line breaks caused by user corrections (e.g. additions to previously written lines) were ground truthed as "correct" line breaks. Examples of the handwritten pages are shown in FIG. 11.

Experiment B

Figures 12, 13:
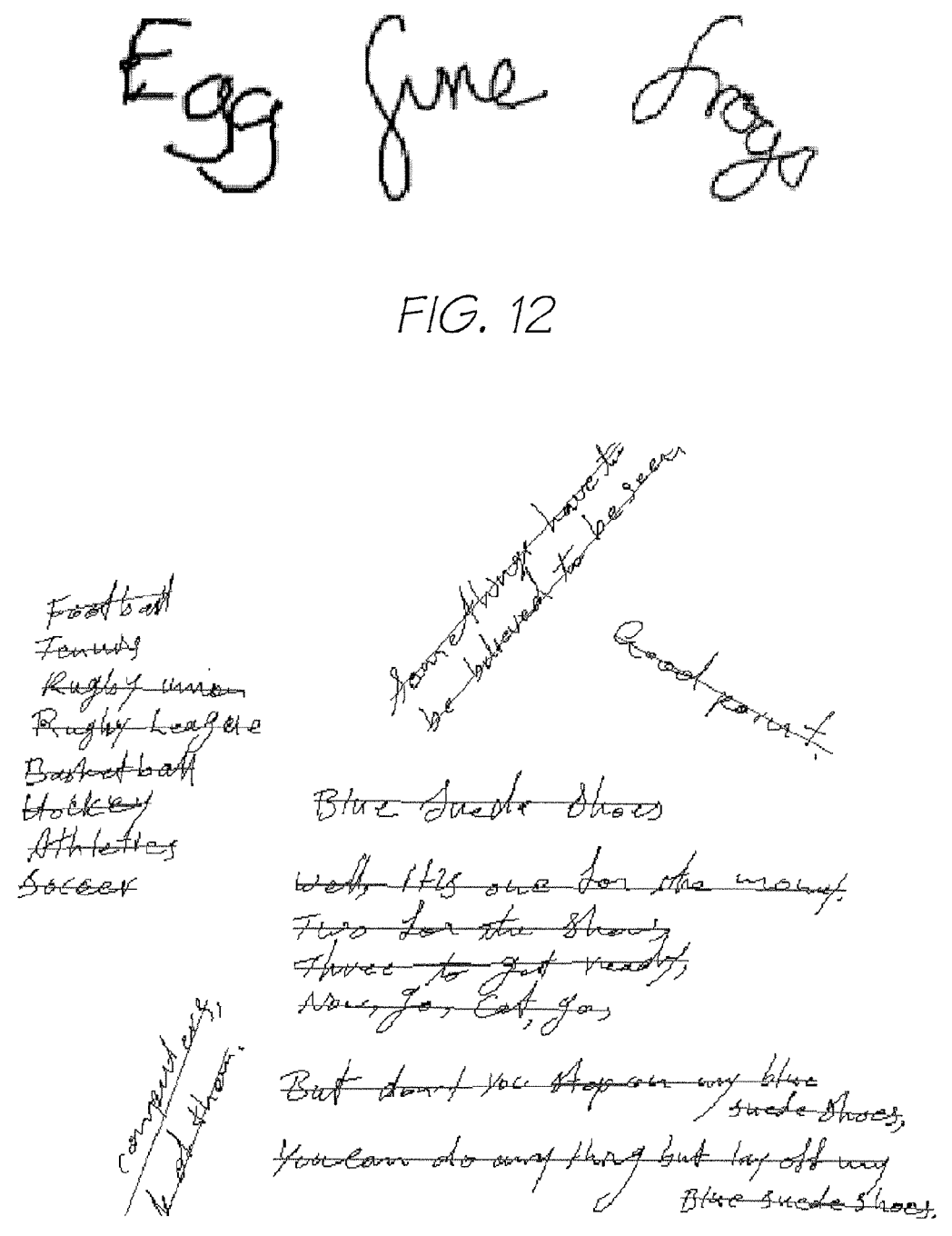

The second experimental data set comprised 14 full pages of cursive text copied from a novel by a single writer. Again, line extraction was evaluated, the difference being that all lines were approximately horizontal (they were written using guide ruler lines). On average each page contained 28 lines which were often touching and their length sometimes changed markedly. In total, the data contained 406 lines or 392 line breaks which were manually ground truthed (exactly as in Experiment A). Examples of the handwritten pages are shown in FIG. 12.

Experiment C

The third experiment was conducted to test the suitability of the text line orientation estimation algorithm. The data consisted of 4208 horizontal English text lines manually segmented from a number of different handwritten documents and manually rotated to arbitrary angles between −180 and 180 degrees which were recorded as ground truth.

The algorithm was implemented on a 1.7 GHz Pentium PC running Windows 2000 using Visual C++. Experiment A was timed and completed in 1.85 seconds excluding the time to load the ink from disk. This is equivalent to approximately 0.1 seconds per page on average or approximately 4 msec on average per extracted line. Experiment B was timed and completed in 3.96 seconds (again, excluding I/O). This is equivalent to approximately 0.28 seconds per page on average or approximately 9.8 msec on average per extracted line. The difference in time between Experiment A and Experiment B is due to the smaller length of the text lines in the first experiment. The total time (excluding I/O) for a cumulative line extraction experiment on the data from both experiments A and B (821 lines) is 7 secs i.e. 0.25 secs per page and 8.5 msec per line. The computational cost of orientation estimation is 2 μsec per line on average in Experiment C. This time increases to 3.6 μsec per line if deskewing (line rotation) is also performed after orientation estimation.

Results:

Numerical results for experiments A and B are presented in Table 1. From the 401 line breaks in Experiment A, 400 (99.75%) were correctly detected while eight false positives and a single false negative were also recorded. The false positives (incorrectly broken lines) were due to large angle variations within N-neighbourhoods within lines. The false negative (incorrectly merged lines) happened at a corrective backwards jump (see the discussion below).

TABLE 1

Line extraction results of Experiment A and B

| | True line breaks | Correctly Detected | false positives | False negatives | Performance |
|---|---|---|---|---|---|
| Exp/ment A | 401 | 400 | 8 | 1 | 0.986 |
| Exp/ment B | 392 | 392 | 5 | 0 | 0.993 |
| Total | 793 | 792 | 13 | 1 | 0.989 |

From the 392 line breaks in Experiment B, all 392 (100%) of them were detected successfully. However, there were 5 false positives mainly due to large intra-line angle variations involving elongated ascenders or descenders (see FIG. 11 for an example). Cumulative results for both experiments A and B are also shown in Table 1.

Table 2 presents results from Experiment C. From a total of 4208 tests, 2910 (69.2%) line orientations were computed within 1 degree from the ground truth values. This figure rises to 3963 lines (94.1%) if we consider deviations within 5 degrees from ground truth, since the original lines were not exactly horizontal. Seventy-two orientations were more than 10 degrees different than the ground truth and they all corresponded to short lines for which the principal orientation may not be reliably computed (see some examples in FIG. 12).

TABLE 2

Experiment C: Orientation estimation results

| Total Number of Lines | >1 degree | >5 degrees | >10 degrees | >100 degrees | >150 degrees |
|---|---|---|---|---|---|
| 4,208 | 1298 (30.8%) | 245 (5.8%) | 72 (1.6%) | 40 (0.9%) | 0 (0%) |

To summarise performance the following formula was used:

$$\alpha = (C - 0.5\,Fp - 1.5\,Fn)/T$$

where C is the number of correctly detected line breaks, Fp is the number of false positives and Fn the number of false negatives. T is the total number of ground truthed line breaks.

The weights in the above equation are explained below. False positives are usually not as detrimental as false negatives are, since broken line parts can be considered as individual lines and pose no problems to subsequent processing modules (e.g. zoning or word/character segmentation or recognition). However, merged lines (missed line breaks) will most likely cause further processing to fail therefore their score is penalised heavier.

The only false negative recorded in the above experiments was caused by a long backwards jump to add a correction before moving on to the next line (shown in FIG. 13). The line break was incorrectly estimated before the correction instead of after it, therefore causing a false negative (miss). Although the line break estimate is wrong by a only a (small) stroke, no attempt was made to measure the "goodness" of the estimates which would require not only use of semantic information (assumed unavailable) but also knowledge of the subsequent algorithms in the recognition system which are directly affected by the results of the line extractor.

Apart from the limitations of the proposed method caused by the accepted text line model and user behaviour assumptions, the accuracy of the proposed algorithm may degrade when operating on writing with extremely small font size due to the lack of an adequate number of points to reliably segment the strokes into substrokes. Similarly, performance may degrade as a result of extremely large font sizes mainly due to the fact that angle variations between groups of neighbouring substrokes are much larger than in writing with commonly used font sizes. In addition, due to the assumption that a text line will contain more than N/2 (here 4) substrokes, operation of the algorithm on data consisting of extremely short (e.g. one or two letter) lines is expected to be unstable.

The sensitivity of the cumulative performance (on the data of both experiments A and B as a function of three of the system's parameters was also studied. Results are presented graphically in FIGS. 16, 17, 18 and 19. The first graph shows that performance is stable when ignoring trajectory angle changes below 20 to 30 degrees. In the present implementation 20 degrees was chosen to favour over-segmentation, without a loss in performance as the graph illustrates. The second graph shows that ignoring small strokes at preprocessing does not affect performance for a wide range of the relative size threshold. This step of the algorithm was kept nonetheless as it was shown to improve accuracy in simple experiments performed during the development of the method. Performance in the third graph is plotted over changing local maxima estimation window size (W). Clearly, the selection of W is not critical in the range from 4 to approximately 18. To favour over rather than under-segmentation, the default value (8) which was chosen in the preliminary experiments was kept. Lastly, the fourth graph shows that best performance is fairly independent of the stroke neighbourhood size in the range between 7 and 12. This validates the initial setting of the stroke neighbourhood size to 8.

Hence, the present method/system:
(i) is experimentally proven to be able to extract on-line handwritten text lines of arbitrary individual length, orientation and font size/style on the same page;
(ii) is robust to user mistakes, overlapping/touching lines, non-text scribbles and diacritical strokes;
(iii) is based on a computationally simple algorithm and is reasonably fast (0.25 secs per page on average);
(iv) does not rely heavily on the selection of its internal parameters (good performance achieved with the default settings);
(v) does not require training or any application specific information, therefore it is flexible;
(vi) can extract lines with curved baselines (although deskewing will not work);
(vii) does not put constraints on either the inter-line or the inter-stroke distance;
(viii) is independent of a language model and is designed to perform well for a number of scripts including Latin, Greek, Cyrillic and their variations;
(ix) can effectively estimate the orientation of the text baseline (assuming straight lines); and
(x) allows for incremental processing of the ink (at the time of input).

The suitability of the method for line extraction and line orientation estimation was experimentally tested using 28 full pages of text consisting of 821 text lines written by 14 different writers. Of the corresponding 793 line breaks, 792 were correctly detected. Only one line break was missed by the algorithm, and 13 non-existent line breaks were introduced. Line orientation estimation was tested on 4208 manually rotated text lines. The estimated orientations were approximately 70% within 1 degree from ground truth and approximately 95% within 5 degrees. All experiments were performed with the same default internal parameters.

Improvements could include the ability to handle lines with significantly curved baselines and the automatic (adaptive) selection of some of the internal parameters.

Thus, there has been provided in accordance with the present invention, a method and system for line extraction in a digital ink sequence.

The invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made by one of ordinary skill in the art without departing from the scope of the present invention.

The invention claimed is:

1. A method of line extraction in a digital ink sequence, said digital ink sequence being generated by an input device used to write handwritten text, the method including the steps of:
   receiving, in a processor communicating with the input device, a stroke sequence comprised of a sequence of strokes;
   segmenting the strokes into a sequence of substrokes by applying a stroke segmentation algorithm;
   calculating a centroid for each substroke;
   using each centroid to calculate
   angular differences between neighbouring groups of substrokes, in the sequence of substrokes; and,
   determining the positions of the extrema of the angular differences, said extrema corresponding to substrokes at line breaks, thereby enabling line extraction in the stroke sequence,
   wherein substrokes are grouped about a selected substroke into a temporally preceding group of substrokes and a temporally subsequent group of substrokes, the centroid of the temporally preceding group and the temporally subsequent group being used to calculate the angular difference at the selected substroke.

2. The method as claimed in claim 1, wherein a centroid is calculated for each substroke, the centroids being used to calculate angular differences between neighbouring groups of substrokes, in the sequence of substrokes.

3. The method as claimed in claim 1, wherein substrokes are grouped about a selected substroke into a preceding group of N substrokes and a subsequent group of N substrokes, the centroid of the preceding group and the following group used to calculate the angular difference at the selected substroke.

4. The method as claimed in claim 1, wherein the extrema are the maxima or minima of the sequence of angular differences as a function of substroke sequence order.

5. The method as claimed in claim 1, wherein the stroke segmentation algorithm includes the steps of:
   smoothing stroke data points;
   computing a relative angle for each line segment connecting successive stroke data points;
   segmenting the stroke into candidate substrokes if the difference between successive relative angles is greater than a preset threshold; and,
   merging candidate substrokes into a substroke if the angular direction of successive candidate substrokes is less than a threshold angle.

6. The method as claimed in claim 1, wherein the stroke sequence undergoes pre-processing.

7. The method as claimed in claim 6, wherein pre-processing includes removing data points that are less than a threshold distance from a preceding data point in the digital ink sequence.

8. The method as claimed in claim 6, wherein pre-processing includes removing strokes that are less than a threshold length dimension compared to neighbouring strokes.

9. The method as claimed in claim 1, wherein the stroke sequence undergoes post-processing.

10. The method as claimed in claim 9, wherein post-processing includes removing any line breaks between substrokes of a parent stroke.

11. A system for line extraction in a digital ink sequence of handwritten text data points, the system comprising:
   (1) an input device to obtain a stroke sequence comprised of a sequence of strokes;
   (2) a processor in communication with the input device and adapted to:
      (A) segment the strokes into a sequence of substrokes by applying a stroke segmentation algorithm;
      (B) calculate a centroid for each substroke;
      (C) calculate angular differences between neighbouring substrokes, or groups of substrokes, in the sequence of substrokes; and,
      (D) determine the positions of the extrema of the angular differences, said extrema corresponding to substrokes at line breaks, thereby enabling line extraction in the stroke sequence,
   wherein said processor is further adapted to group substrokes about a selected substroke into a temporally preceding group of substrokes and a temporally subsequent group of substrokes, the centroid of the temporally preceding group and the temporally subsequent group being used to calculate the angular difference at the selected substroke.

* * * * *